United States Patent
Armbruster et al.

(10) Patent No.: US 9,290,918 B2
(45) Date of Patent: Mar. 22, 2016

(54) OUTLET FITTING, BASIC BODY AND OUTLET BODY THEREFOR

(71) Applicant: Hansgrohe SE, Schiltach (DE)

(72) Inventors: Stefan Armbruster, Hausach (DE); Joachim Blattner, Haslach (DE); Ulrich Kinle, Schenkenzell (DE); Hubert Moosmann, Schiltach (DE)

(73) Assignee: Hansgrohe SE, Schiltach (DE)

( * ) Notice: Subject to any disclaimer, the term of this patent is extended or adjusted under 35 U.S.C. 154(b) by 315 days.

(21) Appl. No.: 14/017,533

(22) Filed: Sep. 4, 2013

(65) Prior Publication Data

US 2014/0076442 A1  Mar. 20, 2014

(30) Foreign Application Priority Data

Sep. 14, 2012 (DE) .......................... 10 2012 216 428

(51) Int. Cl.
  *E03C 1/04* (2006.01)
  *F16L 37/084* (2006.01)
  *F16L 37/32* (2006.01)

(52) U.S. Cl.
  CPC ................. *E03C 1/04* (2013.01); *E03C 1/0402* (2013.01); *E03C 1/0404* (2013.01); *E03C 1/0407* (2013.01); *F16L 37/0841* (2013.01); *F16L 37/32* (2013.01); *E03C 2001/0416* (2013.01); *Y10T 137/9464* (2015.04)

(58) Field of Classification Search
  CPC ....... E03C 1/04; E03C 1/0402; E03C 1/0404; E03C 1/0407; F16L 37/0841; F16L 37/32
  USPC ............ 141/2, 18, 21–22, 392; 137/560, 562, 137/801
  See application file for complete search history.

(56) References Cited

U.S. PATENT DOCUMENTS

| | | | | |
|---|---|---|---|---|
| 1,417,583 A * | 5/1922 | Stratton | ................ | E03C 1/0404 137/630.17 |
| 4,625,780 A * | 12/1986 | Burnham | ............. | B65D 71/502 138/44 |
| 5,653,270 A * | 8/1997 | Burrows | .............. | B67D 3/0032 141/18 |
| 6,161,228 A * | 12/2000 | Wietecha | ................. | A47K 1/02 4/625 |
| 6,611,972 B2 * | 9/2003 | Underbrink | .............. | A47K 1/02 4/619 |
| 8,047,457 B2 * | 11/2011 | Hahn | ...................... | B05B 1/044 239/428.5 |

(Continued)

FOREIGN PATENT DOCUMENTS

| | | |
|---|---|---|
| DE | 202004009285 U1 | 10/2004 |
| DE | 202004006464 U1 | 1/2005 |
| JP | 09078641 A | 3/1997 |
| KR | 20110124879 A | 11/2011 |
| WO | 2006084448 A1 | 8/2006 |
| WO | 2007124931 A1 | 11/2007 |

OTHER PUBLICATIONS

Official Action dated Apr. 8, 2013 in DE 10 2012 216 428.6.
Search Report dated Oct. 11, 2013 in EPO 13182057.3.
Official action dated Dec. 3, 2014 and search report dated Nov. 25, 2014, in CN appln. 201310417245.X, filed Sep. 13, 2013 (English translation).

*Primary Examiner* — Nicolas A Arnett
(74) *Attorney, Agent, or Firm* — Duane Morris LLP

(57) ABSTRACT

An outlet fitting for discharging a fed liquid, in particular a sanitary water supply fitting, has a basic body with a connection for connecting to a liquid supply, and an outlet body connected to the basic body. The disclosure concerns a basic body for use with an outlet body, an outlet body for use with a basic body, as well as their combination in an outlet fitting wherein the outlet body forms a liquid container that is removable from the basic body and can be mounted, for example, on a washbasin or sink.

12 Claims, 5 Drawing Sheets

(56) References Cited

U.S. PATENT DOCUMENTS

| | | | |
|---|---|---|---|
| 2003/0088913 A1* | 5/2003 | Underbrink | A47K 1/02 4/619 |
| 2004/0034924 A1* | 2/2004 | Underbrink | A47K 1/02 4/619 |
| 2008/0073450 A1* | 3/2008 | Hahn | B05B 1/044 239/562 |
| 2011/0209781 A1 | 9/2011 | Fath | |
| 2012/0024988 A1* | 2/2012 | Hahn | B05B 1/044 239/589 |

* cited by examiner

OUTLET FITTING, BASIC BODY AND OUTLET BODY THEREFOR

BACKGROUND OF THE INVENTION

The invention is related to an outlet fitting for discharging a fed liquid, in particular a sanitary outlet fitting like a washbasin fitting or sink fitting, for example, comprising a basic body which has a connection for connecting to a liquid supply, and an outlet body connected thereto, and a corresponding basic body and a corresponding outlet body. The invention is also related to an outlet body and to a basic body configured for use in such an outlet fitting.

Outlet fittings of said type are commonly used in particular in sanitary technology to provide cold and/or hot water which is supplied from an associated water supply to washbasins, sink units etc. Typically, the basic body includes fixing means for fixing at a desired location of employment, like a washbasin or sink unit, and means for control of the water supply, like a mixing and shut-off valve designed as a double-handle faucet, single-lever faucet, or thermostat.

Conventionally, the outlet body is mostly adjoining the basic body in one piece and forms a tubular outlet port. In particular with sink fittings it is also known to allow releasably attaching and demounting an outer housing part of the outlet body by means of a plug-in connection on the basic body, with the outlet body remaining connected to the basic body by a hose portion extendable from the basic body. Thus, the outlet body with its output mouth is able to directly reach virtually the entire sink unit area.

In case the liquid dispensed by the outlet fitting is to be stored temporarily to allow transport of the liquid to a remote location, conventionally an appropriate container, like a cup, a jar, a jug etc. is required, where said container is filled with the liquid at the outlet fitting by holding it under the mouth of the outlet body. In a household, examples are transfer of water to cooking pots, coffee machines etc., and the filling of fresh water decanters for drinking.

BRIEF SUMMARY OF THE INVENTION

It is an object of the invention to provide an outlet fitting, in particular utile in sanitary technology, presenting an improved functionality as compared to the conventional outlet fittings as mentioned above. It is another object of the invention to provide a basic body and an outlet body adapted to use in such an outlet fitting.

The invention achieves these objects in providing a novel outlet fitting, and a basic body and an outlet body configured for use in such novel outlet fitting.

In the novel outlet fitting for discharging a fed liquid according to the invention, an outlet body is designed as a liquid container, i.e., it has a liquid-receiving chamber with an output mouth for liquid discharge leading away. The outlet body is connected to a basic body which in turn has a connection for connecting to a liquid supply. Furthermore, it is provided according to the invention that the outlet body can be removed from the basic body, i.e., basic body and outlet body are coupled to another via a releasable connection in such a manner that the outlet body may be removed from the basic body and reattached thereon.

When the basic body is connected to the liquid supply and the outlet body is attached to the basic body, there is a fluid communication for liquid feeding from a liquid supply to the outlet body, in particular to the liquid-receiving chamber thereof. With the outlet fitting according to the invention, the outlet body thus is a liquid container which can be filled with liquid from the liquid supply at the location of the basic body and then be transferred to a desired location of use by removing from the basic body. Thus, due to the outlet fitting according to the invention, an additional container for liquid transfer is not needed.

The outlet fitting according to the invention may in particular be a sanitary outlet fitting, like a washbasin fitting or a sink fitting, for example.

In an advancement of the invention, the releasable connection of basic body and outlet body is configured as a plug-in connection, by means of which the outlet body can be coupled to the basic body and detached therefrom in a simple and rapid manner. In a specific embodiment, related plug-in means are provided on a bottom face of the outlet body and on a top face of the basic body. In this case, the bottom face of the outlet body can be placed on top of the basic body. In a further embodiment, a locking means is provided for locking the plug-in connection of the outlet body to the basic body in a releasable manner. Thus, unintentional removal or release of the outlet body from the basic body is prevented.

In an advancement of the invention, the fluid connection comprises an inflow channel in the outlet body leading into the liquid-receiving chamber of the outlet body, and an automatic outflow barrier which shuts off the inflow channel against outflow of liquid from the liquid-receiving chamber, when the outlet body is removed from the basic body. This is to prevent that liquid flows out of the liquid-receiving chamber via the inflow channel, when the outlet body has been removed from the basic body. On the other hand, the outflow barrier releases the inflow channel, in order to allow liquid to be fed into the liquid-receiving chamber from the liquid supply, when the outlet body is fitted on the basic body.

In an advancement of the invention, the fluid connection for liquid feeding from the liquid supply into the outlet body comprises an automatic shut-off valve which is provided on the basic body and, when the outlet body is fitted on the basic body, is retained in a release position, while it assumes a shut-off position, when the outlet body is removed from the basic body. The latter prevents an undesirable leaking of liquid from the basic body, when the outlet body is not at the basic body, even in case that an upstream liquid supply control element, like a mixing valve, is opened inadvertently.

In an advancement of the invention, the fluid connection for feeding liquid from the liquid supply into the outlet body comprises a vortex generating (vortexing) means in order to introduce liquid into the liquid-receiving chamber with a centrifugal vortex being formed. An advantage thereby is, for example, a corresponding centrifugal filling characteristic for the liquid-receiving chamber. In an embodiment of the invention, the vortexing means includes a flow-directing body which is arranged in an inflow channel or an entry region to the liquid-receiving chamber. The flow-directing body has at least one chamber-entry opening, with a main component running transversely to a longitudinal chamber direction, and/or a flow-directing flange, which extends in the chamber transversely to a longitudinal chamber direction, and/or at least one flow-directing slot, which runs obliquely in relation to a longitudinal inflow-channel direction in an inflow channel section. These are a structurally advantageous ways to introduce the liquid with the desired vortex into the chamber.

In an advancement of the invention, an air-intake channel is provided which opens out into the inflow channel. Thereby, air can be drawn by means of a suction effect, and admixed to the liquid to be introduced in the liquid-receiving chamber. If desired, said air-intake channel may additionally be designed to be a discharge channel for discharging liquid from the liquid-receiving chamber, when the outlet body is fitted on the basic body. This allows to prevent that liquid remains for an undesirably long time in the liquid-receiving chamber.

The latter aim is achieved in an advancement of the invention also by means of a discharge channel separate from the inflow channel leading away from the bottom zone of the liquid-receiving chamber and extending into the basic body, or a respective discharge channel branches off the inflow channel, in an advancement of the invention, wherein a valve automatically shuts-off and releases the discharge channel relative to the inflow channel by liquid pressure control. The discharge channels may, for example, open into a drain of an associated washbasin or sink unit.

A basic body according to the invention is configured such that it is applicable for the outlet fitting according to the invention. Also, an outlet body according to the invention is configured such that it is applicable for the outlet fitting according to the invention.

BRIEF DESCRIPTION OF THE DRAWINGS

Advantageous embodiments of the invention are illustrated in the drawings and are described in the following. In the drawings.

DETAILED DESCRIPTION OF THE INVENTION

Figure 1:
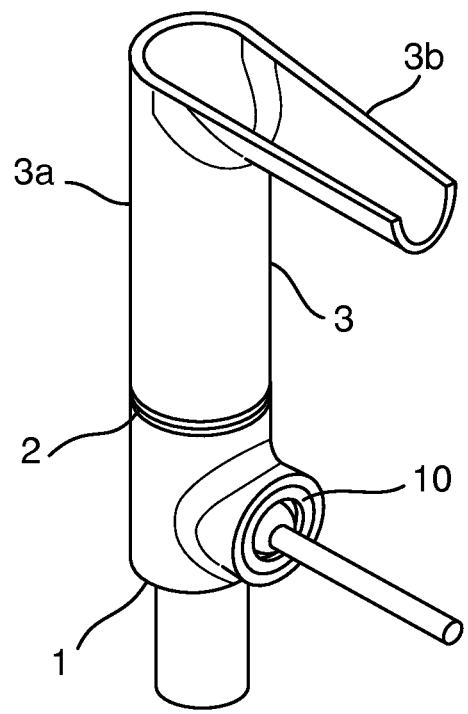
FIG. 1 is a perspective view of an outlet fitting of the single-lever mixing valve type including an outlet body removably placed on a basic body having a cylindrical liquid-receiving chamber and gorge-like output mouth.

The outlet fitting shown in FIG. 1 is suitable, for example, as a washbasin fitting or sink fitting for discharging fed water over a wash basin or sink unit. The fitting comprises a basic body 1 which has a connection for connecting to a water supply in a conventional and thus not further illustrated manner, and a single-lever mixing valve 10 of conventional design. An outlet body 3 is placed on an upper end face of the cylindrical basic body 1 via a releasable connection 2. Due to the releasable connection 2, the outlet body 3 can be removed from the basic body 1 and replaced thereon again. The releasable connection 2 comprises corresponding connection means on a bottom face of the outlet body 3 on the one hand and the upper end face of the basic body 1 on the other hand, and can be implemented in a plug-in connection, for example.

The outlet body 3 is designed to be a liquid container including a liquid-receiving chamber 3a and an outlet mouth 3b for liquid delivery leading out of said chamber. In the example as illustrated, the chamber 3a is a cylinder aligned with the cylindrical basic body 1 and projecting upward therefrom, with the gorge-like outlet mouth 3b leading from the upper section of the cylinder downward with minor inclination.

Due to the design of the outlet body 3 as a component that is removable from the basic body 1 and presenting the liquid-receiving chamber 3a, said body is utile for a water transport container. To that end, when the outlet body 3 is fitted on the basic body 1, the chamber 3a is filled with water by operating the single-lever mixing valve 10, and after that the outlet body 3 is removed from the basic body 1 to transfer the water contained in the chamber 3a to a desired location and there pour it via the outlet mouth 3b as needed.

Figure 2:
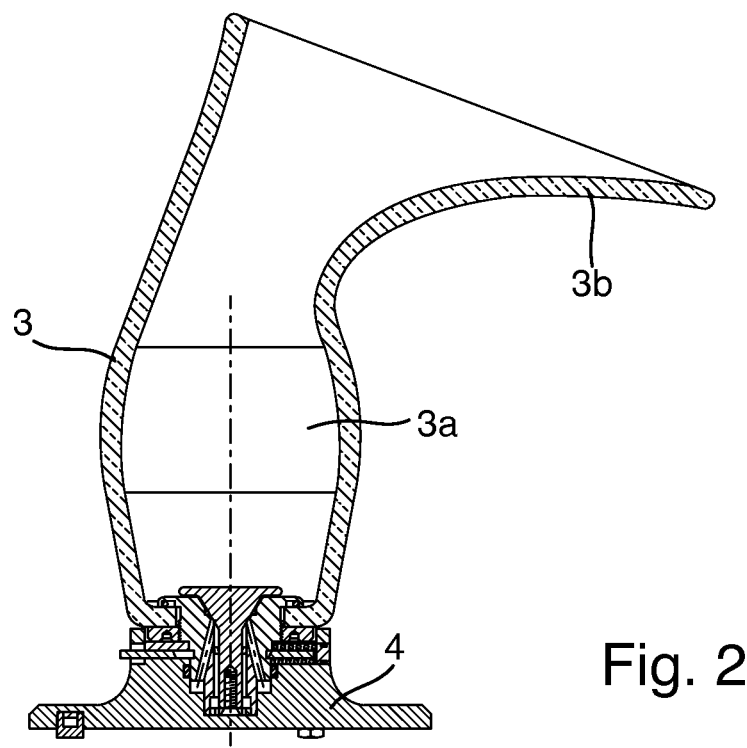
FIG. 2 is a longitudinal view of an outlet body in a modified design as compared to the body of FIG. 1 in a position placed on a support base.

FIG. 2 shows an outlet body 3 in modified design, where herein and in the following the same reference numerals are used for identical and also for functionally equivalent elements, for the ease of understanding. In the example of FIG. 2, the outlet body 3 is somewhat bulgy enlarged in the region of the liquid-receiving chamber 3a, and in the upward adjacent section it continuously passes over to the slightly downward inclined outlet mouth 3b, with the circular cross section of the chamber 3a changing over to an oval outlet mouth cross section.

In the example of FIG. 2, the outlet body 3 is placed releasably on a support base 4, by which it can be put down on a plane surface, like a table, when it has been removed from the basic body. Thus, the outlet body 3 may be used as a table pot, for example. In this case, the outlet body 3 is connected to the support base 4 by a releasable connection 2, which is corresponding to that of basic body 1 and outlet body 3, and will be detailed below.

Figure 3:
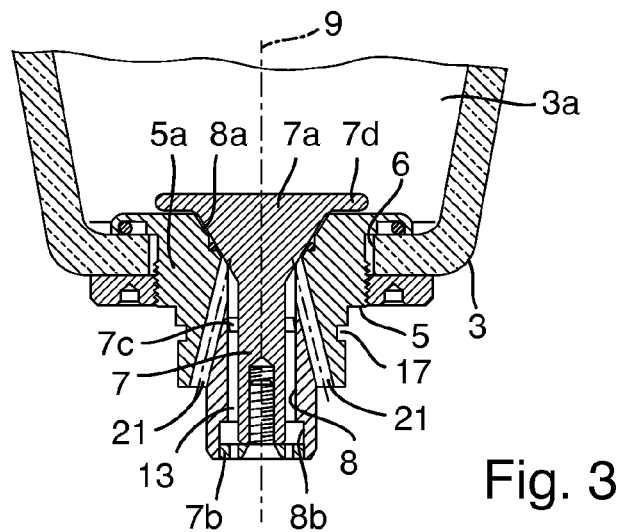
FIG. 3 is a more detailed longitudinal sectional view of a lower portion of the outlet body of FIG. 2.

FIG. 3 shows an exemplary design of a connection zone 5 adapted to be mechanically coupled in releasable manner to the respective basic body via the outlet body 3, or optionally to a support base according to FIG. 2, and thus provides connection means on the outlet body side. Furthermore, the connection zone 5 includes also the required means on the outlet body side for providing the needed fluid communication between outlet body 3 and basic body.

Figure 4:
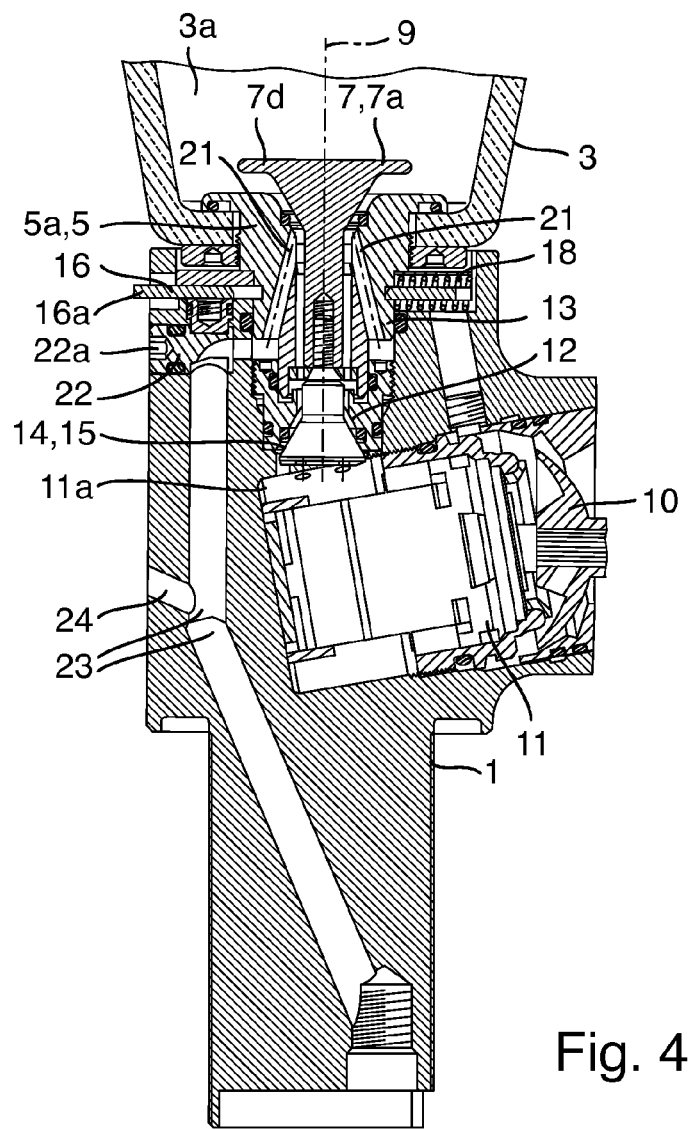
FIG. 4 is a longitudinal sectional view of a basic body according to the type of FIG. 1 with a placed on outlet body according to the type of FIGS. 2 and 3.
Figure 5:
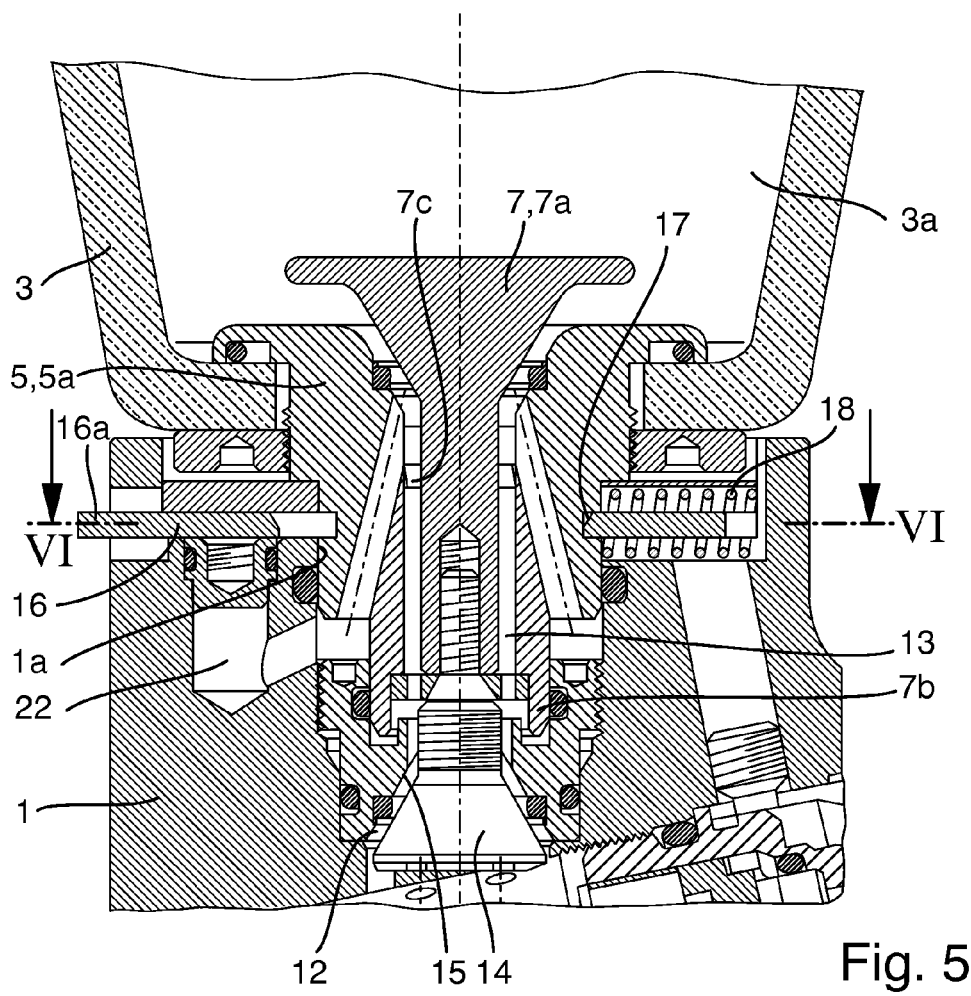
FIG. 5 is a more detailed longitudinal sectional view of a variant of FIG. 4 in a transitional zone of basic body and outlet body.
Figure 7:
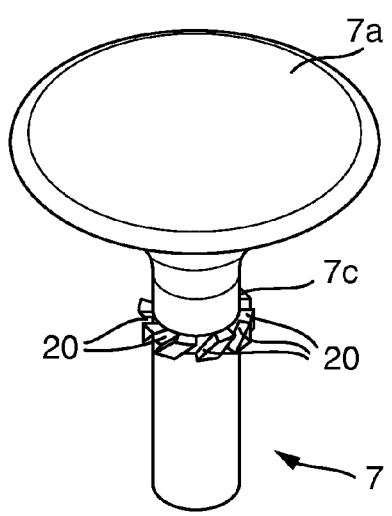
FIG. 7 is a perspective view of a valve and flow-directing body employed in the outlet body of FIGS. 2 to 5.

FIG. 4 shows in longitudinal sectional view an exemplary implementation for the basic body 1 and the single-lever mixing valve 10 according to FIG. 1, and the outlet body 3 placed thereon, where only the lower part is illustrated. FIG. 5 shows an enlarged illustration of the connecting or coupling section between basic body 1 and outlet body 3.

As seen from FIG. 3, the connection zone 5 includes an essentially cylindrical connection block body 5a which is inserted into a bottom aperture 6 of the outlet body 3 in a fluid-tight manner and has a central hole 8, wherein a valve body 7 is disposed. The valve body 7 is positioned with a longitudinal axis identical to a longitudinal axis 9 of the outlet body 3 and is conically widened in a head zone 7a and is there corresponding to a conical enlargement 8a of the central hole 8 acting as a valve seat. In a foot zone a foot part 7b is screwed into the valve body 7 and guided in a lower enlargement 8b of the central hole 8 for strake limitation.

In a condition, when the outlet body 3 is removed from the basic body 1, the valve body 7 assumes a sealing lower end position, illustrated in FIG. 3, due to gravitation and the pressure of liquid contained in the liquid-receiving chamber 3a, as the case may be. Upon placing the outlet body 3 on the basic body 1, the valve body is pushed up from said lower end position into its upper, releasing position, as illustrated in FIGS. 4 and 5. Thereby, the fluid communication for liquid feeding from the liquid supply into the liquid-receiving chamber 3a is enabled, when the basic body 1 is connected to its liquid supply. By operating the mixing valve 10, the liquid-receiving chamber 3a can be filled with water. In the example as shown in FIGS. 4 and 5, water from the supply thus enters into a cartridge chamber 11a of a cartridge 11 of the mixing valve 10 and from there on, through an annular valve channel 12 of a shut-off valve arranged in the basic body 1, to an inflow channel 13 formed by an annular gap in the vicinity of the outlet body 3, specifically in the connection zone 5 thereof, left by the valve body 7 in the central hole 8 of the connection block body 5a. The valve body 7 is an automatic outflow barrier for the inflow channel 13 in that it releases the channel for supply of liquid to the liquid-receiving chamber 3a, when the outlet body 3 is attached to the basic body 1, as illustrated in FIGS. 4 and 5, and shuts it off, when the outlet body 3 is removed from the basic body 1, to prevent back-flow of liquid from the liquid-receiving chamber 3a, as illustrated in FIG. 3.

The shut-off valve arranged in the basic body includes a valve cone 14 and a corresponding valve seat 15. The valve cone 14 is disposed with a longitudinal axis identical to a longitudinal axis 9 of the outlet body 3 and movable along said axis with a predefinable valve strake. In the position with the outlet body 3 placed on the basic body 1, both valve bodies 7, 14 urge into the respective release position thereof, that is, the outlet body valve body 7 is in its upper end position and the basic body valve cone 14 is in a lower end position. When the outlet body 3 is removed from the basic body 1 and the liquid feeding via the mixing valve 10 has inadvertently not yet been closed or is opened inadvertently later on, the water pressure present in the cartridge chamber 11a pushes the valve cone 14 upward to the valve seat 15 thereof and closes the valve channel 12. As a result, the valve cone 14 and the related valve seat 15 form an automatic shut-off valve that assumes a shut-off position, when present, thus preventing that inadvertently by activating the mixing valve 10 water is output from the basic body 1.

Figure 6:
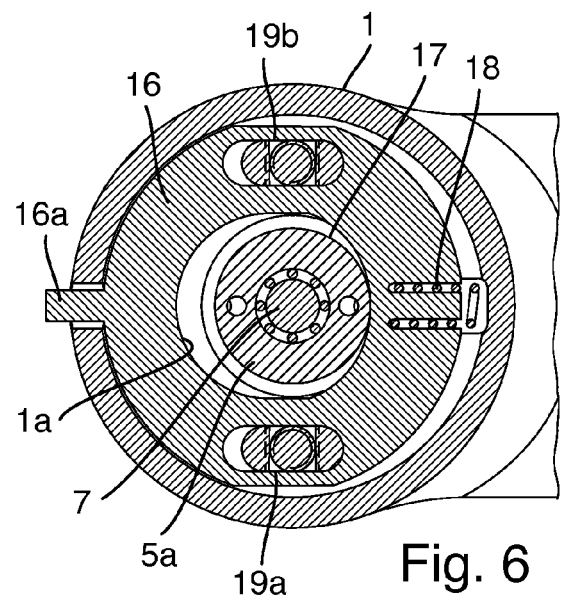
FIG. 6 is a cross-sectional view along a line VI-VI of FIG. 5.

In the example as illustrated, the connection of basic body 1 and outlet body 3 is a releasable plug-in connection, wherein the connection block body 5a of the outlet body 3 is insertable into a corresponding recess or receptacle 1a on the upper end face of the basic body 1. Plugging-on of the outlet body 3 on the basic body 1 and retaining it in the plugged-on position is secured by a locking means for locking the plug-in connection in a releasable manner. As seen from FIGS. 4 to 6, the locking means includes a snap ring 16 disposed in a transversal plane and movable in a transverse direction with a predefinable snap-in travel in the basic body 1, and a corresponding snap-in groove 17 on the outer circumference of the connection block body 5a of the outlet body 3. In the transverse movement direction the snap ring 16 is provided with an actuation lug 16a on one side, extending through a corresponding aperture of the basic body 1 and protruding somewhat from the basic body 1. By means of an opposed pressure spring 18 bearing on the basic body 1, the snap ring 16 is retained in the locking position as shown in FIG. 6, where it engages over a certain peripheral angle by an inner rim with the snap-in groove 17 of the connection block body 5a of the outlet body 3. For unlocking the plug-in connection, a user may push the snap ring 16 on the lug 16a protruding from the basic body 1 against the bias spring 18 out of the snap-in groove 17, whereupon the outlet body 3 may be removed from the basic body 1 upwardly. The movement of the snap ring 16 is guided by two opposed pairs 19a, 19b of long hole slots formed in the snap ring 16 and guiding pins in the basic body 1 engaging in the long hole slots.

During filling the outlet container 3 which is open at the top, care has to be taken to introduce the water into the chamber 3a such that even with the mixing valve 10 opened to maximum, there is no water spilling over the top. One option, that may even present further advantages, is to introduce the water in a centrifugal vortex flow into the chamber 3a. To this end, the water feeding fluid communication has an appropriate vortexing means. In the example as shown in FIGS. 3 to 7, said vortexing means is implemented by adequate structural design of the valve body 7. To this end, the valve body 7 has an annular collar 7c formed in an axial approximately central section, said collar being provided with channel slots 20 extending obliquely with axial component and circumferential component. Water entering axially from below in the inflow channel 13 is guided to a spiral vortex motion. The head zone 7a of the valve body 7 is provided with a radial terminal annular flange 7b, against which the water guided to the spiral vortex motion is flowing from below, while entering into the liquid-receiving chamber 3a from the inflow channel 13. Thereby, the axial flow component of the water is further deflected to a transverse motion so that at a corresponding water pressure the water flows into the liquid-receiving chamber 3a as a centrifugal vortex essentially in a transverse plane, and fills the chamber from below, without untimely upward splashing from the chamber 3a. In addition, said vortex type water inflow into the chamber 3a may have an optical effect, in particular in case the wall of the outlet body 3 is made of glass or another transparent material.

The vortex visibility can be further improved in that the water introduced into the chamber 3a is mixed with drawn-in air, wherein said measure again can have further advantages, as the case may be. The exemplary embodiment of FIGS. 3 to 7 is configured for such air intake and air admixing. To this end, the connection block body 5a of the outlet body 3 has air intake holes 21 ending on the one hand into the inflow channel 13 in the region of the valve seat 8a of the valve body 7 and on the other hand into an air intake channel 22 provided in the basic body 1, said channel 22 having an output to a circumferential side air intake aperture 22a of the basic body 1. When the water to fill the liquid-receiving chamber 3a in the inflow channel 13 is flowing upward, air is drawn in by suction effect via the air intake channels 21, 22 and entrained by the water and admixed thereto, respectively. Due to the pressure conditions, a Venturi effect prevents water from entering into the intake channels 21, 22.

As long as the outlet body 3 remains sitting on the basic body 1, it can operate for water output from the fitting in conventional manner. When water feeding is stopped, the water in the liquid-receiving chamber 3a remains for the time being. In many cases, it may be desirable not to have said water remaining for too long a time, but to have it drain slowly. In the example as illustrated, said draining can be caused after closing the mixing valve 10 in that the water from the chamber 3a is discharged via the air intake channels 21, 22. From there it can reach a bowl of the washbasin/sink unit or be led off directly into an associated washbasin/sink drain. The latter is illustrated in the example of FIG. 4 in the form of a drainage hole 23 of the basic body 1 leading from the air intake channel 22 to a conventional, not shown, washbasin or sink drain. A transverse hole 24 outputting from the drainage channel 23 on the basic body periphery allows sewage water pushed up in the drainage channel 23, as the case may be, to exit from the basic body 1 and return to the washbasin/sink. Also, the transverse hole 24 can be operative as a further air intake hole.

In the example as illustrated, the connection block body 5a and the related receiving cavity in the basic body 1 are cylindrical so that the outlet body 3 can be plugged onto the basic body 1 in any rotatory position and is also freely rotatable in the plugged-in position relative to the basic body 1. Optionally, it can be provided in addition that the connection block body 5a is pivotable relative to the remaining outlet body 3, and that the housing wall of the chamber 3a can be released from the connection block body 5a at least in a certain rotatory position, for the purpose of cleaning, for example. For this, the connection block body 5a can remain in its locked plug-in connection on the basic body 1.

Figure 8:
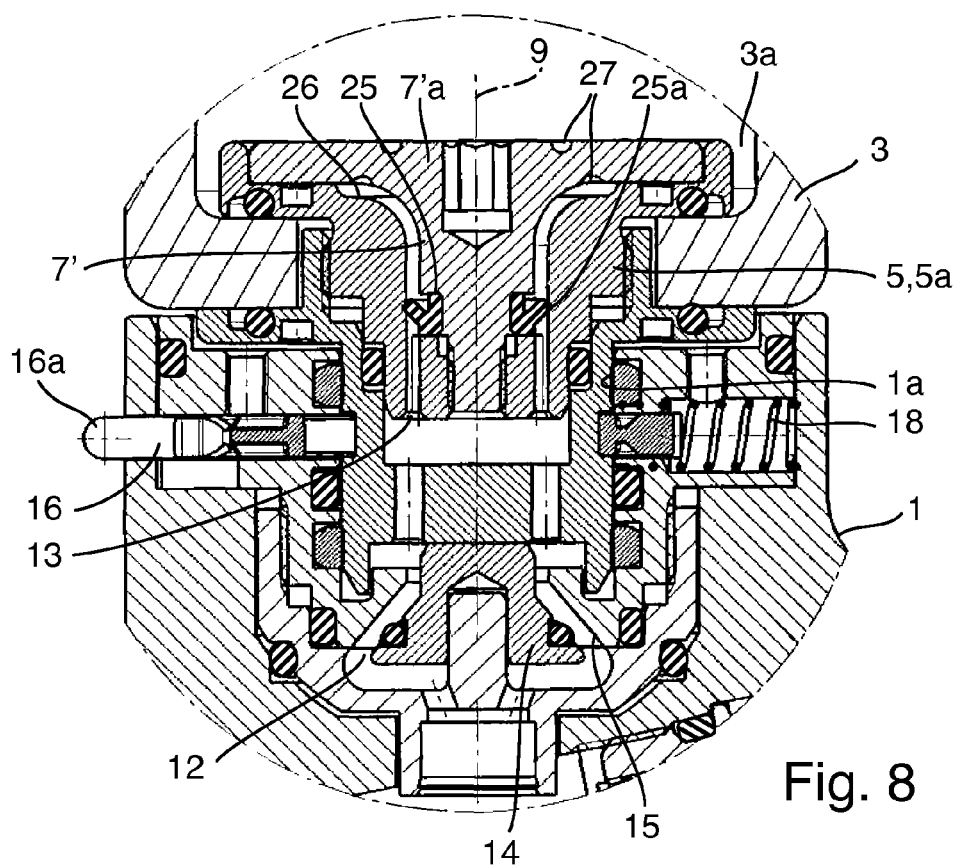
FIG. 8 is a longitudinal sectional view of the transitional zone between basic body and outlet body, similar to FIG. 5, for another variant of an outlet fitting.

FIG. 8 illustrates a variant of the outlet fitting of FIGS. 2 to 7, wherein the same reference numerals are used for functionally equivalent elements and in this respect reference is made to the above explanations related to the exemplary embodiment of FIGS. 2 to 7. The variant of FIG. 8 differs from the example of FIGS. 2 to 7 primarily in the use of a modified valve body 7' for the inflow channel 13. A rubber sealing member 25 inserted in an annular groove of the valve body 7' serves herein for an outflow barrier, with a movable sealing ring lip 25a integrally shaped to said sealing member and projecting in radial and axial direction in such a manner that the sealing lip 25a retreats to a water pressure from below and bears onto the sealing member thereby releasing the inflow channel 13 or is urged into the annular groove of the valve body 7', while with an opposite water pressure acting from above the lip is spread and forms a tight barrier of the inflow channel 13. Thus, the rubber sealing member 25 forms a back-pressure valve to enable water feeding into the liquid-receiving chamber 3a of the outlet body 3, while draining of the chamber 3a via the inflow channel 13 is prevented, in particular when the outlet body 3 is removed from the basic body 1.

Furthermore, the outlet fitting according to FIG. 8 includes a modified vortex generating means, here again to introduce water in a centrifugal vortex into the chamber 3a. With the fitting of FIG. 8, to that effect the valve body 7' terminates in a transverse flange 7'a at its head end, where the bottom face of the flange is provided with an adequate flow-directing profile 26 and flow channel holes 27 are provided therein leading into the chamber 3a from the inflow channel 13. The flow-directing profile 26 and the flow channel holes 27 are formed such that water flowing in the inflow channel 13 axially upward is deflected into an essentially transverse extending centrifugal vortex, and thus flows into the chamber 3a on the top face of the valve body 7'.

Figure 9:
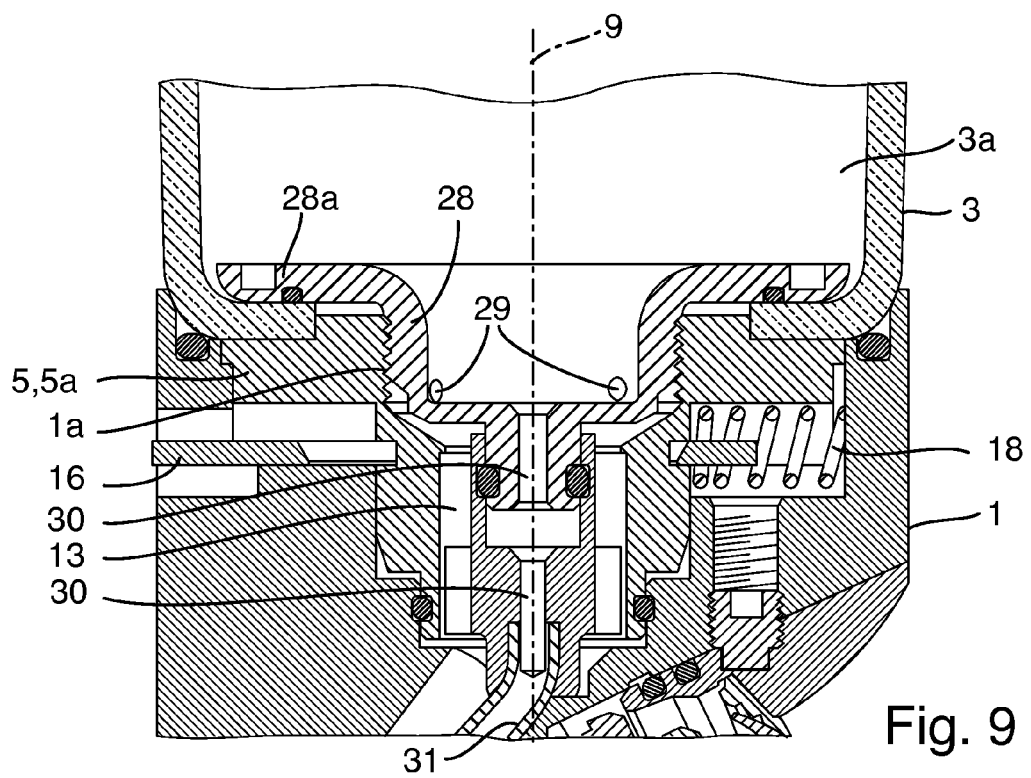
FIG. 9 is a longitudinal sectional view of the transitional zone of basic body and outlet body for an outlet fitting variant including a central discharge channel.

FIG. 9 shows another variant of the outlet fitting of FIGS. 2 to 7. In said variant, a trough-shaped vortexing body 28 is attached to the connection block body 5a, said vortexing body 28 with an upper transverse annular flange 28a extending radially approximately up to the side wall of the liquid-receiving chamber 3a and thereby closing the opening in the bottom wall of the chamber 3a with an interposed sealing ring in a fluid-tight manner. The vortexing body 28 is provided with a plurality of peripheral inlet holes 29 in the vicinity of the trough bottom, said holes traversing the trough side wall obliquely essentially in a transverse plane, i.e. with a radial component and a circumferential component. In this way, water flowing in the inflow channel 13 axially upward is led through the inlet holes 29 and thereby deflected into a vortex flow located in an essentially transverse plane. Said centrifugal vortex flow propagates from the pot (trough) bottom upward until the water exits from the vortexing body 28 and fills the chamber 3a in a centrifugal vortex flow.

Furthermore, the outlet fitting according to FIG. 9 is provided with a direct discharge channel 30 leading centrally along the outlet body longitudinal axis 9 from the pot bottom of the vortexing body 28 provided with a corresponding aperture downward and merging in a discharge hose 31 in the basic body 1. Since water introduced into in the chamber 3a, as explained above, flows along the pot side wall of the vortexing body 28 in a centrifugal vortex, there is no noteworthy amount of water entering downward in the central discharge channel 30 during the filling operation of the chamber 3a. Upon shut-off of the water feeding, water can slowly be drained from the chamber 3a via the discharge channel 30, so as not to remain too long in the outlet body 3, when said body 3 is on the basic body 1.

Figure 10:
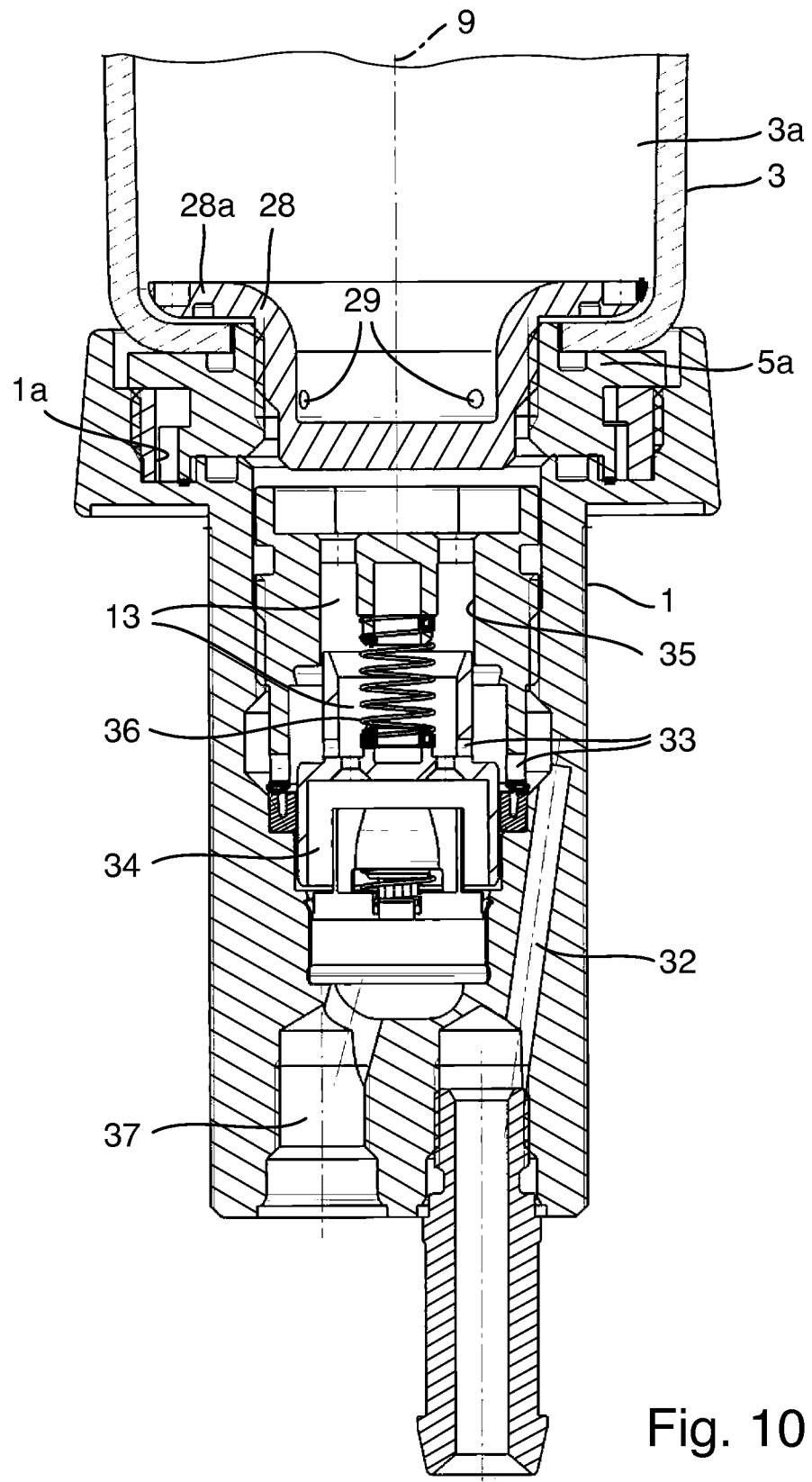
FIG. 10 is a longitudinal sectional view of a basic body with a placed on outlet body for another outlet fitting variant.

FIG. 10 shows another outlet fitting according to the invention, where again the same reference numerals are used for functionally equivalent elements, as in the exemplary embodiments explained above, and in that context reference is made to the respective description. Similar to the variant of FIG. 9, the outlet body 3, here as well, has a pot-shaped vortexing body 28 held in a bottom aperture of the chamber 3a on an adequately constructed connection block body 5a. The vortexing body 28 according to FIG. 10 is operable in the same way as explained above in relation to that of FIG. 9 and to that purpose has the mentioned vortex generating flow channel holes 29 in the region of the lower pot side wall.

In the fitting of FIG. 10, a discharge channel 32 is provided in the basic body 1 by means of a corresponding hole leading out of the inflow channel 13 via a radial communication aperture 33. A shut-off valve is associated to the communication aperture 33 to allow automatic shut-off and release under liquid pressure control. To this end, the shut-off valve has a U-annular valve body 34 disposed in a respective central hole 35 of the basic body 1 to be axially movable. In FIG. 10 the valve body 34 is shown in its lower end position, in which it releases the fluid communication 33 of the discharge channel 32 to the inflow channel 13 and from which it can be urged to an upper end position, where it blocks the communication aperture 33 between the inflow channel 13 and the discharge channel 32.

When the outlet body 3 is to be filled with water, the water fed from the water supply enters a connection channel 37 in the basic body 1 from below and from there flows in the basic body section of the inflow channel 13 upward to then flow into the chamber 3a in a centrifugal vortex flow via the pot of the vortexing body 28. Thereby, the valve body 34 is urged upward by water pressure and held in the upper end position so that the discharge channel 32 remains shut off. When water feeding is stopped and the water pressure subsides, the valve body 34 is urged into its lower end position and releases the communication 33 of the inflow channel 13 to the discharge channel 32. Thus, water stored in the liquid-receiving chamber 3a can gradually flow back down to the inflow channel 13 and then be drained via the discharge channel 32, e.g. into an available basin/sink drain. Optionally, the shut-off valve may additionally be designed such that the inflow channel 13 is shut-off relative to the connection channel 37, when a water pressure is present in the connection channel 37, but the outlet body 3 is removed from the basic body 1.

As is clear from the exemplary embodiments as illustrated and explained above, the invention provides an advantageous outlet fitting comprising an outlet body which is removable from a basic body and designed as a liquid container. Furthermore, the invention provides an accordingly designed basic body and an accordingly designed outlet body as separate objects which may be employed in variable ways and manners as needed, i.e. outlet bodies in different design may be used for a specific basic body, and a specific outlet body may be placed on different basic bodies. It will be appreciated that the invention comprises numerous alternatives to the examples shown, as will be easily recognized for a person skilled in the art from the use of expertise substitute means. Thus, instead of the mentioned plug-in connection, other releasable connections of basic body and outlet body may be used as an alternative, like screw and bayonet connections, for example.

What is claimed is:

1. An outlet fitting for discharging a fed liquid, comprising:
    a basic body that is configured for mounting on one of a washbasin and sink, by structure for fixing the basic body to the washbasin or sink, and by a connection configured for connecting the basic body to a liquid supply for the washbasin or sink, and
    an outlet body that is connected to the basic body,
    wherein the outlet body is designed as a liquid container that is removable from the basic body for carrying liquid.

2. The outlet fitting according to claim 1, wherein the outlet body is connected to the basic body in releasable manner by a plug-in connection.

3. The outlet fitting according to claim 2, wherein the plug-in connection comprises associated plug-in-engageable structures on a bottom face of the outlet body and on a top face of the basic body.

4. The outlet fitting according to claim 2, further comprising a locking structure for locking the plug-in connection in a releasable manner.

5. The outlet fitting according to claim 1, wherein a fluid connection for feeding liquid from the liquid supply into the outlet body comprises an inflow channel in the outlet body, said inflow channel leading into a liquid-receiving chamber of the outlet body, and an automatic outflow barrier, which shuts off the inflow channel, when the outlet body is removed from the basic body, against liquid flowing out of the liquid-receiving chamber, and releases it, when the outlet body is fitted on the basic body, for feeding liquid into the liquid-receiving chamber.

6. The outlet fitting according to claim 5, further comprising an air-intake channel, which opens out into the inflow channel.

7. The outlet fitting according to claim 1, wherein a fluid connection for feeding liquid from the liquid supply into the outlet body contains an automatic shut-off valve which is provided on the basic body and, when the outlet body has been fitted on the basic body, is retained in a release position and, when the outlet body has been removed from the basic body, assumes a shut-off position.

8. The outlet fitting according to claim 1, wherein a fluid connection for feeding liquid from the liquid supply into the outlet body has a vortexing path configured to introduce the liquid into a liquid-receiving chamber of the outlet body with a centrifugal vortex being formed.

9. The outlet fitting according to claim 8, wherein the vortexing path contains a flow-directing body which is arranged in an entry region to the liquid-receiving chamber or in an upstream inflow channel, and wherein the flow-directing body comprises at least one of:
    at least one chamber-entry opening, with a main component running transversely to a longitudinal chamber direction,
    a flow-directing flange, which extends transversely to a longitudinal chamber direction, and
    at least one flow-directing slot, which runs obliquely in relation to a longitudinal inflow-channel direction on a section projecting into an inflow channel upstream of the liquid-receiving chamber.

10. The outlet fitting according to claim 1, further comprising a discharge channel for discharging liquid from a liquid-receiving chamber of the outlet body, when the outlet body is fitted on the basic body, wherein the discharge channel leads away from a bottom region of the liquid-receiving chamber, separately from an inflow channel, and extends into the basic body.

11. The outlet fitting according to claim 1, further comprising a discharge channel for discharging liquid from a liquid-receiving chamber of the outlet body, when the outlet body is fitted on the basic body, wherein the discharge channel extends from an inflow channel and a valve is provided, this valve automatically shutting off and releasing the discharge channel in relation to the inflow channel under liquid pressure control.

12. The outlet fitting according to claim 1, wherein the outlet fitting is configured as a sanitary fitting providing water to the washbasin or sink.

* * * * *